Figure 1:
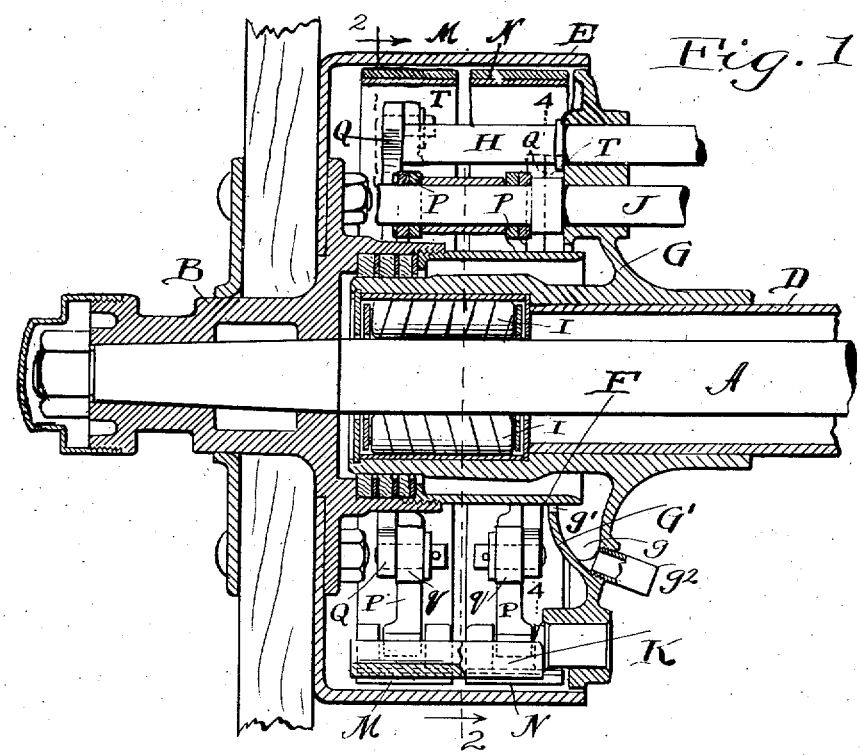

A. P. BRUSH.
BRAKE DRUM PROTECTOR.
APPLICATION FILED FEB. 15, 1911.

1,019,755.

Patented Mar. 12, 1912.

2 SHEETS—SHEET 1.

Witnesses
E. B. Gilchrist,
H. B. Sullivan.

Inventor
Alanson P. Brush
by Thurston & Kwis
Attorneys

A. P. BRUSH.
BRAKE DRUM PROTECTOR.
APPLICATION FILED FEB. 15, 1911.

1,019,755.

Patented Mar. 12, 1912.

2 SHEETS—SHEET 2.

Witnesses
E. B. Gilchrist
H. R. Sullivan

Inventor
Alanson P. Brush
by Thurston & Kwis
Attorneys

UNITED STATES PATENT OFFICE.

ALANSON P. BRUSH, OF FLINT, MICHIGAN.

BRAKE-DRUM PROTECTOR.

1,019,755. Specification of Letters Patent. Patented Mar. 12, 1912.

Application filed February 15, 1911. Serial No. 608,666.

*To all whom it may concern:*

Be it known that I, ALANSON P. BRUSH, a citizen of the United States, residing at Flint, in the county of Genesee and State of Michigan, have invented a certain new and useful Improvement in Brake-Drum Protectors, of which the following is a full, clear, and exact description.

This invention is designed to prevent oil or other lubricant of a wheel or axle bearing from passing from the bearing onto the braking surface of a brake drum attached to the wheel, or the brake band or bands for engaging with said brake drum.

This invention is of particular value in automobile construction, and is shown in the drawing in connection with one of the driving wheels of an automobile and the parts associated therewith.

The invention consists in providing a concentric tube fixed to the wheel outside of the bearings thereof, and a fixed oil receiving pocket into which the open end of said tube projects; and it also consists of certain other more specific combinations of parts as set forth in the claims.

Figure 2:
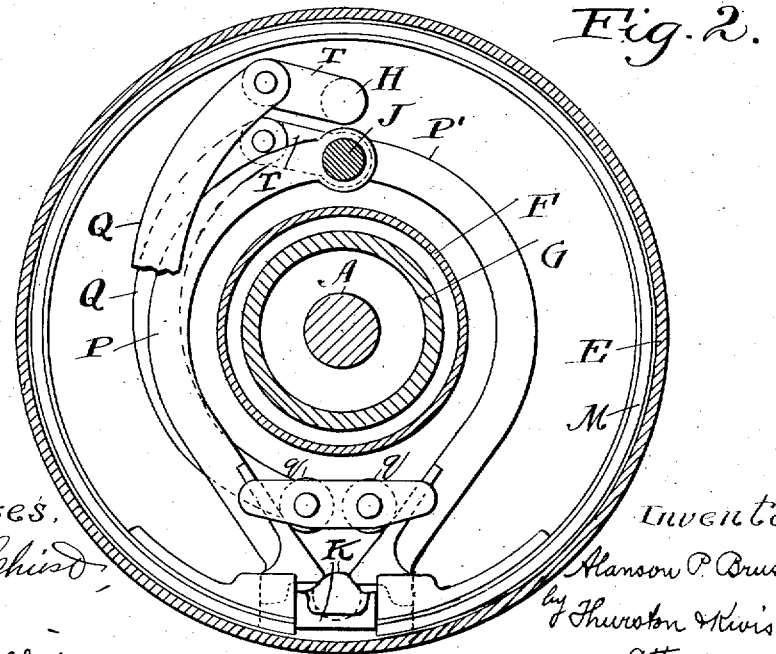
Figure 3:
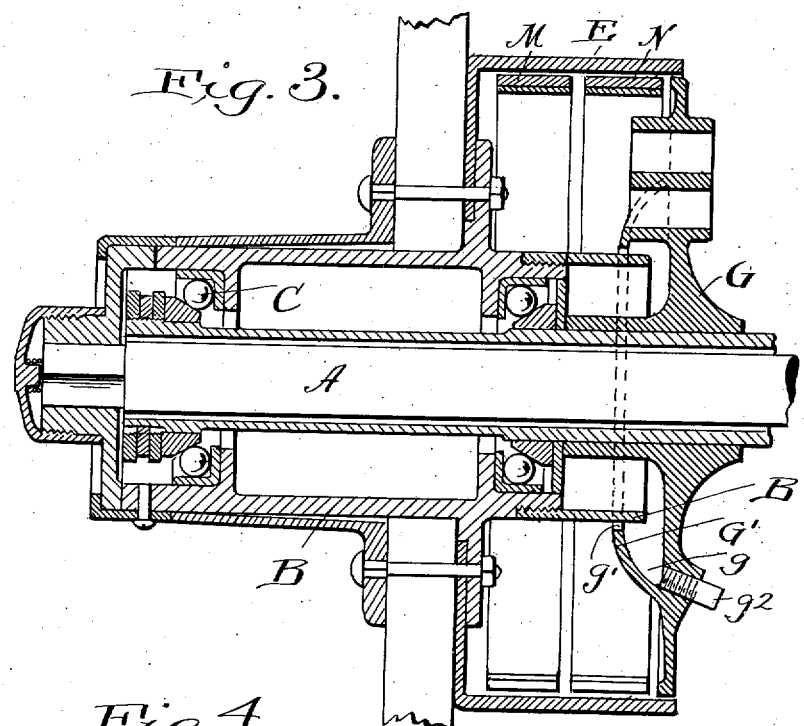
Figure 4:
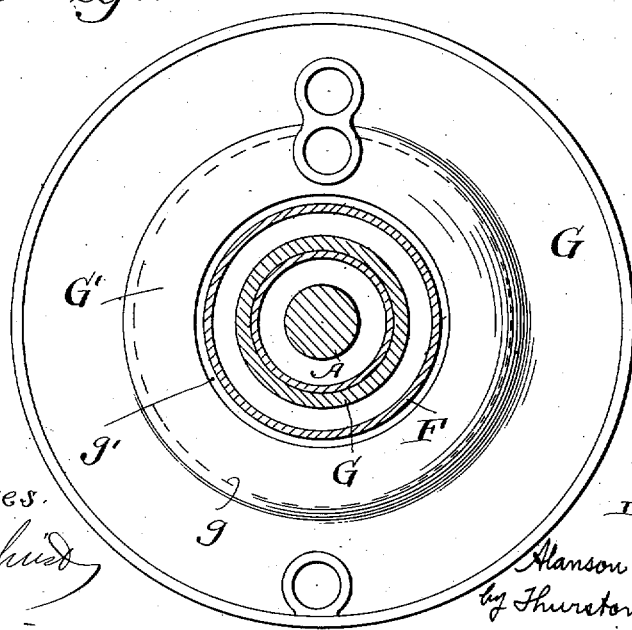

In the drawing, Figure 1 is a central vertical sectional view of the hub part of a wheel and other associated parts to which my invention is applied. Fig. 2 is a transverse sectional view in the plane of line 2—2 on Fig. 1. Fig. 3 is a central sectional view of a wheel hub and its associated parts of what is known as the full floating type, in which the invention is embodied. Fig. 4 is a sectional view in the plane indicated by line 4—4 of Fig. 1 with the brake band, operative and controlling mechanisms left off.

Referring to the parts by letters, A represents one of the live axle sections of an automobile rear axle.

B represents the hub of the driving wheel which must be connected with the live axle, so as to rotate with it.

D represents the non-rotatable axle tube through which the live axle passes. Those familiar with automobile construction will understand that this tube is a lateral extension of the differential gear housing, and that this tube is generally connected through the medium of springs with the chassis frame. In the construction shown in Fig. 1 this live axle is mounted in roller bearings I within the tube D, and near the outer end thereof; and the wheel may be fixed in any suitable manner to the projecting end of this live axle.

The construction shown in Fig. 3 is what is known as the full floating type. In this construction the wheel hub is rotatably mounted in anti-friction bearings C upon the axle tube D; and the projecting out end of the live axle A is to be connected with the wheel by any suitable means, of which quite a variety are in common use, and well known.

In both constructions shown a brake drum E is fixed to the wheel, and is concentric therewith. In both constructions two brake bands M and N are within this brake drum. An annular flange G which is rigid with the axle tube D furnishes the bearings for two rock shafts H and J by which to operate the brake band expanding mechanisms of these two brake bands. The specific number of brake bands employed, their construction, and their operating and controlling mechanism, as shown, is merely typical and is not material to the present invention. In the construction shown, however, a bar K fixed to the disk G extends in a direction parallel with the axle within the brake drum and between the approximate ends of the two brake bands—the function of this bar being to stop the turning of said brake bands with the brake drum. The means for expanding both brake bands are substantially the same, although full disclosure is made of only one of such expanding means. By reference to Fig. 2, it will be noted that two curved arms P, P' are loosely hung on the shaft J and extend on opposite sides of the axle, and have their ends introduced between the approximate ends of the brake band M, and in engagement respectively with said ends, so that, by forcing the ends of the levers P, P' apart, the brake band will be expanded. To force them apart, a link Q is provided with two friction rollers $q$ which lie between and engage respectively with the arms P, P'. The upper end of this link is pivotally connected with an arm T which is fixed to the shaft H. By rocking this shaft the rollers $q$, $q'$ will be forced away from the axle and between the converging ends of the arms P, P', so as to expand them.

The disk G contains an annular oil pocket $g$ which surrounds the tube D. The inner wall G' of this pocket has a central annular opening $g'$, into which projects the outer open end of a tube F which is fixed to the hub B of the wheel outside of the bearings which support the axle A, as shown in Fig. 1, or the wheel hub B, as shown in Fig. 3. It is evident that any oil which may exude from the bearings shown in either figure must flow into this tube F, and from thence it will be discharged into the oil pocket $g$; and it may flow out of this pocket through the open tube $g^2$; but cannot, by any possibility, get into the brake drum or onto the braking surfaces.

Having described my invention, I claim:

1. The combination of a rotating wheel, bearings for supporting the wheel, a brake drum carried by the wheel, a tube fixed to the wheel and within the brake drum, an annular oil pocket into which the end of the tube projects.

2. The combination of a rotating wheel, a live axle upon which the wheel is mounted, a non-rotatable sleeve surrounding the said live axle, and forming a bearing therefor, an oil channel associated with the said sleeve, a brake drum carried by the wheel, a tube mounted upon the hub of the wheel and within the drum, the end of the tube projecting into the said oil channel.

3. The combination with the live axle of an automobile, a rotatable wheel fixed to said axle, and a brake drum fixed to said wheel, with the non-rotating axle tube, anti-friction bearings supported by said tube and in turn supporting the wheel, a disk fixed to said tube containing an annular oil pocket, and a tube fixed to the wheel within and concentric with the brake drum, and projecting into said oil pocket,—the interior of said tube being in communication with said bearings.

In testimony whereof, I hereunto affix my signature in the presence of two witnesses.

ALANSON P. BRUSH.

Witnesses:
W. H. NACKER,
E. L. THURSTON.